United States Patent
Oatley

[15] 3,678,384
[45] July 18, 1972

[54] ELECTRON BEAM APPARATUS

[72] Inventor: Charles W. Oatley, Cambridge, England
[73] Assignee: Cambridge Scientific Instruments Limited, Cambridge, England; a part interest
[22] Filed: Aug. 25, 1969
[21] Appl. No.: 852,710

[30] Foreign Application Priority Data

Aug. 24, 1968 Great Britain.................40,560/68

[52] U.S. Cl. .................324/158 R, 250/49.5 A, 324/73 R, 324/130
[51] Int. Cl..................................G01r 31/22, G01r 15/12
[58] Field of Search.................324/158, 158 D, 54, 73, 130; 250/49.5, 49.5 A; 330/9

[56] References Cited

UNITED STATES PATENTS

| | | | |
|---|---|---|---|
| 3,051,860 | 8/1962 | Haine et al.......................250/49.5 X |
| 3,373,353 | 3/1968 | Harris.................................324/54 |
| 3,448,377 | 6/1969 | Seiwatz et al....................324/54 |
| 3,531,716 | 9/1970 | Tarui et al........................324/158 X |
| 3,549,999 | 12/1970 | Norton............................324/158 D |

OTHER PUBLICATIONS

Wells, O. C.; "Contactless Measuring Method;" IBM Tech. Dis. Bull.; Vol. 11; No. 5; Oct. 1968; pg. 531.
Kresge et al.; "Integrated Circuit Inspection;" IBM Tech. Dis. Bull.; Vol. 11; No. 7; Dec. 1968; pg. 813.

Primary Examiner—Rudolph V. Rolinec
Assistant Examiner—Ernest F. Karlsen
Attorney—Scrivener, Parker, Scrivener and Clarke

[57] ABSTRACT

In electron beam apparatus in which an electron beam is caused to impinge on a specimen surface and the resulting secondary electrons are analyzed to show the distribution of electric potential on the surface, the potential on the surface is switched rapidly on and off or the potential on a grid between the specimen and collector is switched rapidly between two levels, and the signals from the collector in the two conditions are directed into two channels, from which the difference signal is used to show the potential of the surface, largely independent of topography and other factors. The beam itself can also be switched on and off at double the switching frequency. In the grid version there can be a second grid to shield the specimen from the switched grid.

13 Claims, 3 Drawing Figures

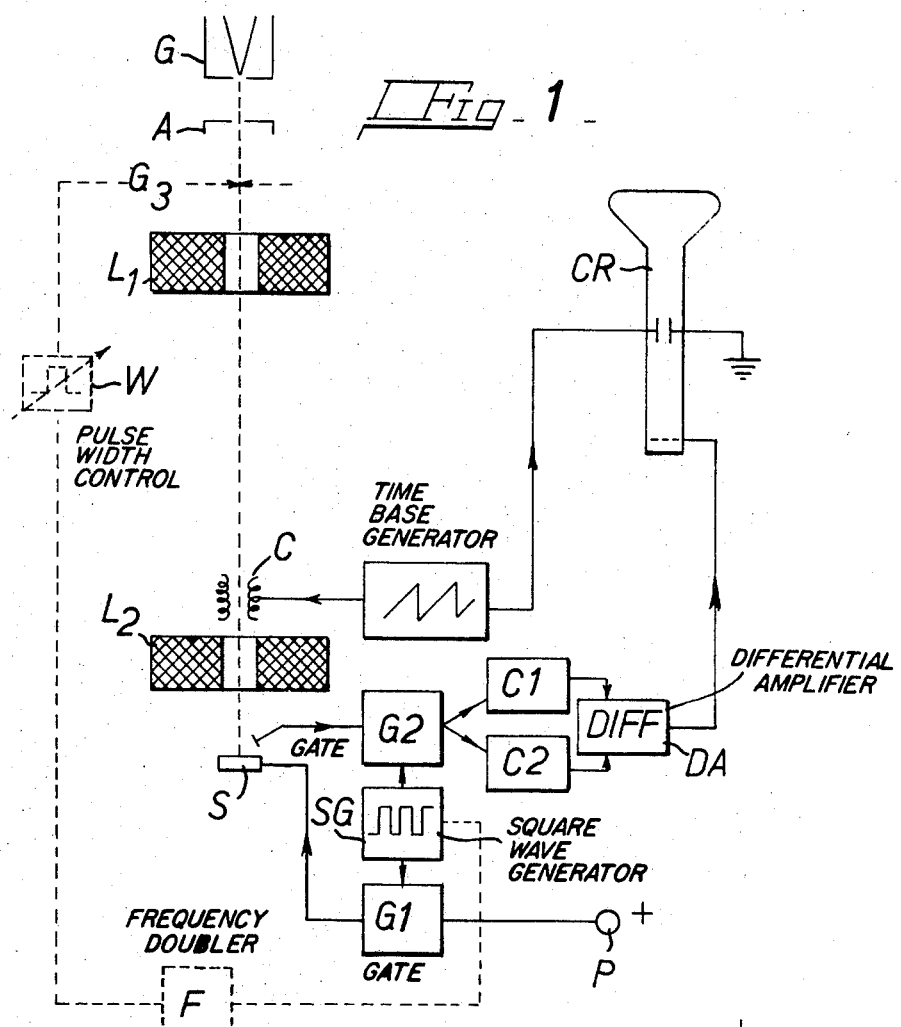
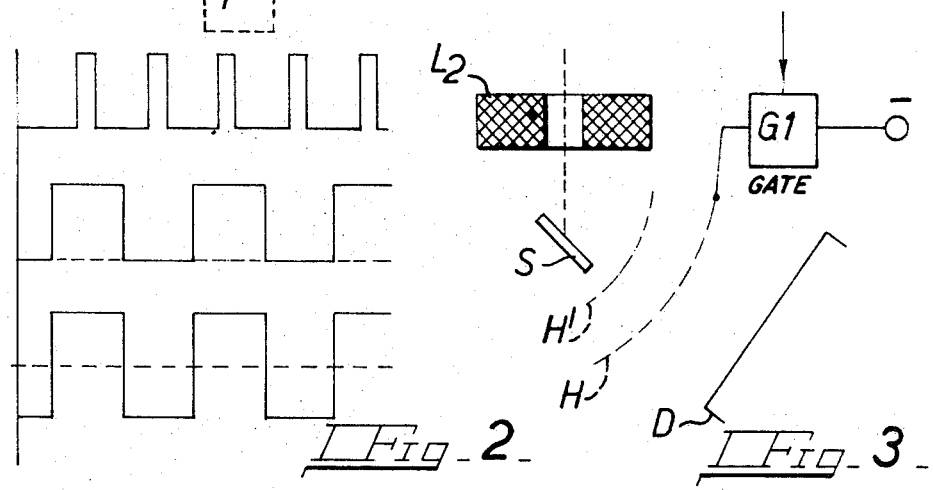

ELECTRON BEAM APPARATUS

This invention relates to scanning electron beam apparatus in which a fine beam or probe of electrons is focused on a specimen and scanned over an area of it, and the secondary electrons reflected and/or generated by the impact are collected and used to form a contrast image of the scanned region, displaying a characteristic of that region.

The invention concerns in particular the production of an image showing the distribution of electric potential over the surface of the specimen. This includes the distribution of other phenomena which are capable of being used to derive a potential contrast.

In existing scanning electron microscopes the primary electrons, that is to say those of the beam that is focused on the specimen, generally have high energies which in a typical case might be 20 KeV, though much lower energies have sometimes been used. Of the electrons that emanate from the scanned portion of the specimen, often all loosely called secondary electrons, a proportion are reflected primary electrons which have lost little of their initial energies, while the remainder are true secondary electrons with energies ranging from zero to a few tens of electron volts.

A fraction of electrons leaving the specimen must be collected to provide a signal from which the image of the specimen is built up on the face of a cathode-ray tube or on any other suitable recorder. To this end, a collector is maintained at a positive potential with respect to the specimen so that secondary electrons over a reasonably wide solid angle will be attracted to it. Some of the reflected primary electrons will also be collected. In a typical case the potential difference between specimen and collector might be 250 volts.

Contrast in the image results primarily from the fact that the number of electrons passing from the specimen to the collector, and hence the strength of the output signal from the collector, depends on the topographical features of the surface and on the secondary-emission coefficient at the point of impact of the primary beam. With a suitable disposition of the collector, the number of electrons reaching it depends also on the potential (relative to the collector and/or neighboring elements on the specimen surface) of that area of the specimen on which the primary beam is incident. Variations in potential of a fraction of a volt on the surface of the specimen can thus give rise to observable variations in brightness of the corresponding portions of the image. However, brightness variations in the image resulting from potential variations on the specimen may well be masked by brightness variations caused by topographical features of the specimen surface or by variations of its secondary-emission coefficient. Even when this is not the case, interpretation of the overall contrast in the image is often difficult.

The main aim of the present invention is to balance out as far as possible disturbing influences from topography and other effects and to allow the display of potential contrast largely independently of such influences.

According to the invention it is proposed to apply to the specimen or to an electrode introduced into the path between the specimen and the collector, a voltage which is switched on and off rapidly, so that when the voltage is on there are potential variations on the surface of the specimen or variations in the signal reaching the collector, but when it is off the variations disappear. In synchronism with this switching, the output from the secondary-electron collector is switched to alternate channels and then it is the difference between the signals in these two channels that is used to produce the contrast image. In one preferred arrangement the signal in each channel is an amplitude-modulated square-wave signal. It will be appreciated that the signal in one channel corresponds to conditions when a voltage is applied to the specimen, while the signal in the other channel corresponds to conditions of zero applied voltage. In the preferred arrangement the output signal from each channel is passed to a demodulator and the two demodulated signals are subtracted one from the other. The final difference signal is used to vary the spot brightness of a cathode-ray tube which, as in normal scanning electron microscopy, is scanned in synchronism with the electron beam falling on the specimen. In this way a visible two-dimensional image is formed on the screen, in which contrast results primarily from variations of potential on the surface of the specimen.

The invention will now be further described by way of example with reference to the accompanying drawings, in which:

FIG. 1 illustrates diagrammatically the electron beam apparatus according to the invention in its simplest form, with a modification shown in broken lines;

FIG. 2 is a graph illustrating the switching pattern used in the modified version; and FIG. 3 is a diagram showing only the region of the specimen and the collector, and illustrating a further development of the invention.

Referring first to FIG. 1, the electron beam apparatus is basically of known form, comprising an electron gun G, an accelerating anode A, beam-forming and final lenses L1 and L2, and scanning coils C. The beam impinges on a specimen S, and the resulting back-scattered or secondary electrons are picked up by a detector in the form of an electron collector, for example a scintillator connected to a photomultiplier, shown at D. In a known form of apparatus the signals from the photomultiplier are simply amplified and used to control the brightness of the trace on the screen of a cathode ray tube CR, the beam of which is scanned in synchronism with the scanning of the analyzer, so that an image of the scanned region of the specimen is displayed on the screen, the contrast in the image showing that contrast in the specimen surface which is such as to cause a variation in the number of electrons reaching the detector D as the beam moves over the surface.

Where the specimen surface has regions of differing electric potential these will produce different signals in the detector, and so it is possible to produce an image of the potential distribution. However, as explained earlier, these differences produced by potential variations can be masked by variations in brightness, or topography, or of the nature of the material. Materials of different natures may have different secondary emission coefficients.

Where the potential on the specimen is an externally applied one, for example where the specimen is a semiconductor body with one or more junctions between regions of different kinds, or is an integrated circuit element comprising several regions of different conductivity and potential, we now propose to switch this potential on and off intermittently. As indicated in FIG. 1 we interpose between the source of potential P and the specimen a gate G1 controlled by a square-wave generator SG. The switching frequency is high compared to the scanning frequency of the beam, for example 100 KHz where the scanning is at about 30 lines a second, so that the spot on the specimen, i.e. the point of impingement of the beam, does not move appreciably from one "on" cycle to the next. The generator SG also controls a second gate G2 in synchronism with the gate G1, switching the signal from the detector D alternately to each of two channels C1 and C2. Thus one channel carries the signal received when there is no potential applied to the specimen and the other carries the signal received when the specimen has a potential on it. The signals in the two channels are demodulated and are then compared in a differential amplifier DA, the difference signal being fed to the cathode ray tube.

Thus the image appearing on the screen of the cathode ray tube displays as far as possible only potential contrast, ignoring other factors; it is true that topography may have a second-order effect on contrast since the extent to which potential variations give rise to contrast is itself somewhat influenced by topography. However, in practice this second-order effect has not been found troublesome.

With some specimens it may happen that, after a voltage has been applied to or removed from the specimen, a short interval of time must elapse before the latter has settled down to its new state. In such a case a modification is needed to enable the invention to be carried out satisfactorily, as follows.

The primary beam itself is switched on and off at a frequency which is twice that at which the voltage applied to the specimen is switched and the intervals during which the beam is on may or may not be equal to those during which it is off. By suitable choice of the switching frequencies and of the phase relation between the two switching circuits it may then be arranged that the primary beam is on for only a portion of each of the intervals during which the electron collector is connected to one or the other of the two amplifying and detecting channels and that there is sufficient time between the successive pulses of beam current for the specimen to have been switched from one of its two states to the other and to have reached substantial equilibrium in its second state.

This modification is indicated in broken lines in FIG. 1, in which the generator SG is shown connected through a frequency doubler F and a pulse width control W to a gate G3 in the path of the primary beam. This gate may take any convenient form, for example a square-wave voltage may be applied to the grid of the electron gun G to suppress the beam. Alternatively the voltage may be applied to a pair of deflection plates positioned so as to deflect the beam away from the axis of the instrument.

FIG. 2 is a graph illustrating the relationship between the timing of the "on" periods of the beam (the upper line) the potential on the specimen (middle line), and the switching of the signal to the two channels (the bottom line).

In the above description of the invention reference has been made to the signal derived by the collection of secondary electrons from the specimen. In this context the term collector is to be taken to include any device which can be used to convert an input current of free electrons into a roughly proportional output voltage. Moreover, the invention can be applied equally well when the original signal is derived not from the collection of secondary electrons but from variations in the total electron current flowing to the specimen; that is to say the difference between the incident current arriving at the specimen and the secondary and reflected electron current leaving it.

It has been stated that contrast resulting from potential variations on the specimen can be produced by suitably positioning the collector with respect to the specimen. The invention is not, however, limited to this arrangement. Grids or other electrodes, maintained at fixed or varying potentials, may be mounted in the vicinity of the specimen or the collector to influence the flow of secondary electrons from specimen to collector and thus to influence the potential contrast obtained in the image.

The invention is applicable to the examination of both the static and the dynamic behavior of circuit elements and is particularly useful in the examination of micro-miniature integrated elements. It will be understood that in general the specimen must be of materials which are sufficiently good conductors to allow the potentials to leak away during the "off" periods of the beam, and so the static charge distribution on non-conducting materials cannot be examined in this way.

It will also be understood that the invention can be used not only to examine directly the potential contrast in circuit elements but also any other phenomena which are capable of being used to derive a potential contrast and are capable of being switched on and off in the required manner.

Moreover, by the further modification shown in FIG. 3 it is possible also to apply the invention to situations where the potential on the specimen itself cannot be switched on and off, for example where there are static contact potentials. This Figure shows an arrangement in which a grid H is inserted between the specimen S and the detector D. Here, as in the arrangements described above, the scintillator unit is at a positive potential with respect to the specimen, so as to attract a worthwhile number of the secondary electrons. In the version of FIG. 3 this potential can be of the order of 250 volts. The grid H is at a relatively low potential, which is obtained from the square-wave generator G and is switched between two levels, both of which are preferably adjustable by altering the amplitude and the mean level of the signal applied to the grid from the generator. For example the grid may be switched between 0 and −5 volts.

In a manner similar to that of the arrangement of FIG. 1, in the periods when the grid H is at 0 volts the signal passes to one of the two channels C1 and C2 and when the grid is at −5 volts it passes to the other channel; the difference signal controls the display unit formed by the cathode-ray tube.

When the beam is impinging on a region of the specimen which is at 0 volts the secondary electrons leaving the specimen with energies of less than 5 volts (the great majority of these electrons) will be halted and turned back by the grid H during the periods in which the grid is at −5 volts, but will be allowed through in the intervening periods when it is at 0 volts. There will therefore be a signal at the output of the difference amplifier DA.

When the point on the specimen on which the beam is impinging has an effective potential of, say, −2 volts, only those secondary electrons having an energy of less than three volts will be stopped by the grid during the "−5 volt" periods, but not during the "0 volt" periods. Thus the difference signal at the output of the amplifier DA will be smaller for regions of the specimen surface which are at −2 volts than for those regions which are at zero volts. Hence contrast is produced and can be displayed on the screen of the cathode tube, and this contrast is due solely to differences in potential, while contrast which would otherwise result from topography or from variations in the secondary emission coefficient of the different regions is largely eliminated. This is because, although these two factors of topography and secondary emission coefficient will produce variations in the number of electrons produced, by our step of taking a difference signal we eliminate from the signal variations in the number of electrons emerging from the different points of the specimen and observe substantially only variations in their energy, hence in surface potential.

We may add a second grid, as indicated at H′, connected to a constant (though possibly adjustable) positive potential to provide an initial accelerating field to draw the secondary electrons towards the collector and to make the electric field at the surface of the specimen independent of the potential of the grid H. In the example illustrated the specimen is tilted with respect to the direction of the primary electron beam and the grids and collector are placed to one side so that there is no interference between the beam and the collector (which in this case virtually must be a scintillator) and so that the signal in the scintillator is not falsified by picking up substantial numbers of high-energy reflected primary electrons. However there are ways (not shown) of operating with surface of the specimen normal to the beam.

Although the version of FIG. 3 has been described with reference to grids H and H′ it is to be understood that the same result can be achieved by the use of any system of electrodes to which a switched voltage can be applied, as long as the output from the differential amplifier depends on the potential at the surface of the specimen.

I claim:

1. A method of analyzing the distribution of electric potential on the surface of a specimen in which a beam of electrons is caused to impinge on that surface and the resultant stream of secondary electrons are detected by a collector to produce electrical signals which are evaluated by recording means, wherein the improvement comprises switching on and off the stream of secondary electrons from the specimen surface to the collector, switching the electrical signal from the collector into two alternate channels in synchronism with said switching, and feeding the difference in the signals in these two channels to the recording means.

2. The method set forth in claim 1, wherein said electron beam is switched on and off in synchronism with said switching but at twice the frequency.

3. The method set forth in claim 2 wherein the duration for which said electron beam is switched on is variable.

4. The method set forth in claim 1 wherein said electron beam is caused to scan the surface of the specimen and said final signal is displayed on recording means scanned in synchronism with said beam, the frequency of said switching being high in relation to the frequency of scanning.

5. A method of analyzing the distribution of electric potential on the surface of a specimen in which a beam of electrons is caused to impinge on that surface and the resultant stream of secondary electrons are detected by a collector to produce electrical signals which are evaluated by recording means, wherein the improvement comprises switching on and off the potential on the specimen surface, switching the electrical signal from the collector into two alternate channels in synchronism with said switching, and feeding the difference in the signals in these two channels to the recording means.

6. A method of analyzing the distribution of electric potential on the surface of a specimen in which a beam of electrons is caused to impinge on that surface and the resultant stream of secondary electrons are detected by a collector to produce electrical signals which are evaluated by recording means, wherein the improvement comprises switching the level of the potential on a barrier electrode between the specimen and the collector, switching the electrical signal from the collector into two alternate channels in synchronism with said switching, and feeding the difference in the signals in these two channels to the recording means.

7. Apparatus for analyzing the distribution of electric potential on the surface of a specimen comprising means for forming a beam of electrons and causing said beam to impinge on said specimen surface, a collector placed to receive resultant secondary electrons from said specimen surface, a first signal channel, a second signal channel, a first gate switching signals from said collector to said first and second channels alternately, a differential device operable to produce a signal dependent on the difference in the signals in said first and second channels, evaluating means connected to said differential device, a source of potential, a second gate interposed between said source and said specimen, said second gate connecting said potential intermittently to said specimen, and said first and second gates being synchronized.

8. Apparatus as set forth in claim 7, including a third gate controlling said electron beam to switch said beam on and off said specimen said third gate being synchronized with said first and second gate but operable at twice their frequency.

9. Apparatus as set forth in claim 8 wherein said third gate includes means for varying the "on" time of said beam.

10. Apparatus as set forth in claim 7 including first scanning means operable to cause said beam to scan said specimen surface and second scanning means operable to cause the output of said differential device to scan said recording means, said first and second scanning means being synchronized, and the frequency of switching of said gates being high in relation to the scanning frequency of said scanning means.

11. Apparatus for analyzing the distribution of electric potential on the surface of a specimen comprising means for forming a beam of electrons and causing said beam to impinge on said specimen surface, a collector placed to receive resultant secondary electrons from said specimen surface, a first signal channel, a second signal channel, a gate switching signals from said collector to said first and second channels alternately, a differential device operable to produce a signal dependent on the difference in the signals in said first and second channels, evaluating means connected to said differential device, an electrode system interposed between said specimen surface and said collector, and means switching the potential on said electrode system between two levels, said switching means being synchronized with said gate.

12. Apparatus as set forth in claim 11 including a shield electrode disposed between said electrode system and said specimen surface.

13. Apparatus as set forth in claim 11 including means for varying the levels of the potential of said electrode system.

* * * * *